March 22, 1949.　　　　A. H. STARK　　　　2,465,127
DEVICE FOR ATTRACTING FISH
Filed May 31, 1946
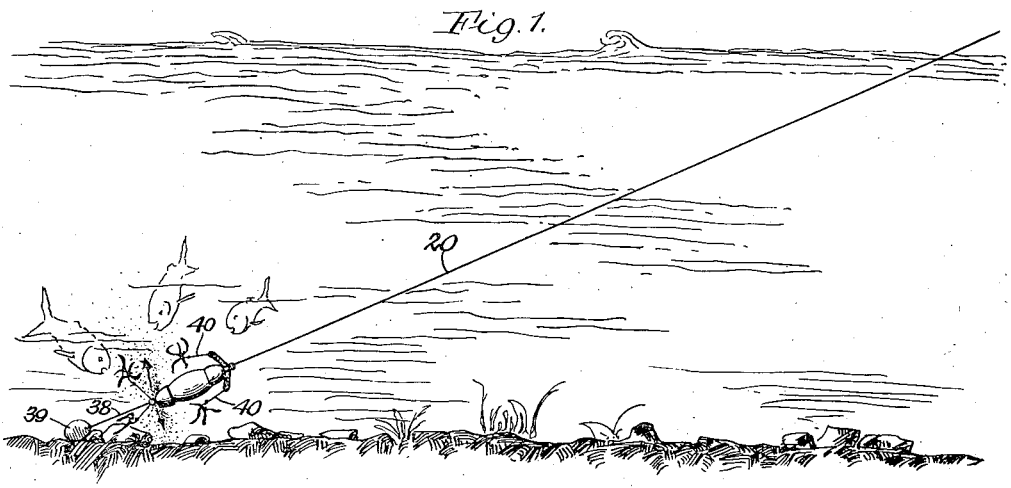
Fig. 1.
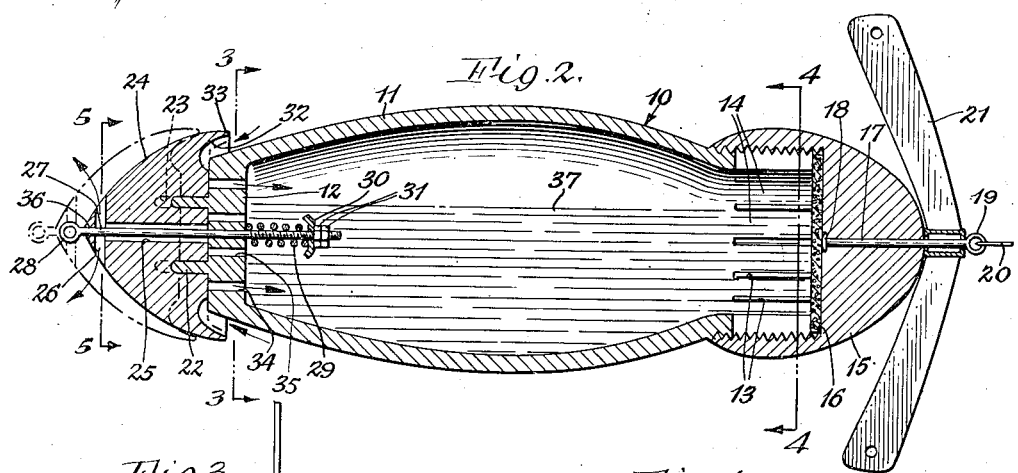
Fig. 2.
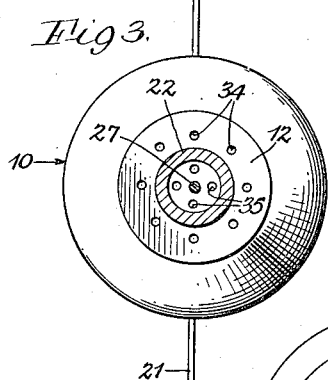
Fig. 3.
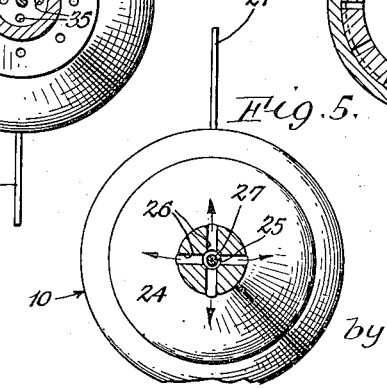
Fig. 4.
Fig. 5.
Inventor
Alex H. Stark
Popp and Popp
Attorneys Patented Mar. 22, 1949

2,465,127

UNITED STATES PATENT OFFICE 2,465,127

DEVICE FOR ATTRACTING FISH

Alex H. Stark, Buffalo, N. Y.

Application May 31, 1946, Serial No. 673,332

4 Claims. (Cl. 43—4)

This invention relates to devices for attracting fish to the locality of a fisherman and more particularly to such a device which dispenses a scented fluid so as to create an effluvium in the water, the dispensed scented fluid being pleasing and attractive to fish.

One of the principal objects of the present invention is to provide such a device which controls the discharge of the scented fluid.

Another important object is to provide such a device which carries the scented fluid and releases the same into the water.

Another object is to provide such a device which may be used in such manner that its movement through the water determines the amount of scented fluid discharged therefrom.

Another aim is to provide such a device with fish hooks for catching the fish attracted by the scent of the fluid discharged from the device.

A further aim is to provide such a device which may be readily and easily refilled with the scented fluid which attracts the fish.

A further aim is to color such a device so as to be attractive to fish.

Other advantages of such a device include simplicity of construction and inexpensive manufacture.

In the accompanying drawings:

Fig. 1 is a view illustrating one way in which my new device for attracting fish may be used.

Fig. 2 is an enlarged, vertical, longitudinal section through the device.

Fig. 3 is a vertical, transverse section thereof taken on line 3—3, Fig. 2.

Fig. 4 is a vertical, transverse section thereof taken on line 4—4, Fig. 2.

Fig. 5 is a vertical, transverse section thereof taken on line 5—5, Fig. 2.

The device embodying my invention includes a container 10 having a side wall 11 and a rear end wall 12. The side wall 11 is imperforate and the container may be of any desired shape, it being shown as elongated and circular in cross section and convex along its major axis. The front end portion of the container is cylindrical and provided with a plurality of slits 13 extending longitudinally rearwardly from the front edge of the container a certain distance thereby forming fingers 14, the peripheries of which are threaded so as to screw into a threaded hole provided in a closure member or cap 15. A disk 16 of any suitable gasket material such as cork is interposed between the base of the hole in the cap 15 and the ends of the fingers 14. It will be noted, as shown in Fig. 2, that the rear portion of the cap 15 extends rearwardly past the bases of the slits 13. To insure against casual and unintentional removal of the cap from the container the free ends of the fingers 14 are initially spread radially outward so that when the cap is screwed thereon the sprung fingers exert an outward pressure on the cap.

The head of the cap is shown as being provided with a central, longitudinally extending bore in which a spindle 17 is arranged so as to be freely rotatable in this bore. The rear end of the spindle 17 is flattened to form a head 18 which fits in a counterbore provided at the rear end of the bore in the cap and the front end of the spindle extends out of the cap and is formed to provide an eye 19 to which a line 20 is attached. If desired a spinner 21 may be arranged on the spindle 17 between the eye 19 and the nose of the cap 15 and fish hooks on leaders may be connected to the ends of the spinner, as illustrated in Fig. 1.

The rear wall 12 is provided with a rearwardly extending annular neck 22 which is slidable in a correspondingly shaped annular groove 23 provided in a valve member 24. This valve member is provided with a central, longitudinally extending, through bore 25 and a plurality of radial outlet passageways 26 formed near the outer end of the member and communicating with the bore 25. A stem 27 is arranged in the bore 25 and has an eye 28 as its rear end which is outside the valve member and its threaded front end extends slidably through a central bore provided in the rear wall 12 into the interior of the container 10, a coil spring 29 being arranged on the spindle 27 with one of its ends bearing against the front face of the rear wall 12 and its opposite end bearing against a washer or spring retainer 30 which is held in position by the nuts 31 screwed on the end of the stem. The front end of the valve member 24 is provided with an annular groove 32 immediately inside its periphery thereby leaving a continuous annular lip 33 which surrounds the rear end of the container in spaced relation thereto and also extends forwardly beyond the rear face of the end wall 12. The body of the valve member within the annular groove 32 is formed to provide a flat face which is adapted to abut the rear face of the rear wall 12. The rear wall 12 is provided with a series of circumferentially spaced inlet holes 34 arranged in a ring outside the annular neck 22 and a series of circumferentially spaced outlet holes 35 arranged in a ring inside the annular neck, as best shown in Fig. 3.

It will be noted that the bore 25 is larger in diameter than the stem 27 thereby providing a passageway surrounding the stem and leading from the front face of the valve member 24 to the radial outlet passageways 26. The valve member 24 is secured to the stem 27 in any suitable manner, as indicated at 36, so as to prevent any relative movement between the valve member and the stem.

The interior chamber of the container 10 is adapted to hold a scented fluid indicated by the numeral 37, which is pleasing and attractive to fish. This fluid may be either poured directly into the container or an open-ended vial (not shown) containing a quantity of the scented fluid may be inserted in the container. To fill the container the cap 15 is unscrewed and removed from the threaded fingers 14 and a quantity of the scented fluid is either poured into the container or an open-ended vial containing the fluid is inserted in the container. The cap 15 is then screwed back in place. In this connection it may be necessary to radially contract the spring fingers 15 in order that their exterior threads will engage the threaded hole in the cap. The cap is screwed down tight on the container so that the ends of the fingers will firmly seat on the gasket 15. This gasket prevents leakage in or out through the bore in the cap in which the spindle 17 is arranged.

The inlet holes 34 and outlet holes 35 in the opposite or rear end of the container 10 are normally kept closed by the front face of the valve member 24 engaging the rear face of the rear wall 12, the spring loaded valve stem 27 constantly urging the valve member to its closed position.

One use of the device is illustrated in Fig. 1 wherein the device is shown arranged on the end of the line 20 leading to the fisherman and a leader 38 connected to the eye 28 of the valve stem 27 and carrying a sinker 39 at its lower end. Baited hooks 40 are shown as being connected to the ends of the spinner 21 and also to the eye 28. With the device in this condition and filled with the scented fluid as previously described herein, a pull on the line 20 will move the device and the drag on the valve cap member 24 caused by the sinker 39 and also the water impinging against the wall of the annular groove 32 will move the valve member away from the rear wall 12 of the container to the broken line position shown in Fig. 2, the movement of the valve member being guided by the annular neck 22 and cooperating groove 23. This lifting of the valve member opens the water inlet holes 34 and scented fluid outlet holes 35 and permits water scooped in by the groove 32 to enter the container 10 through the holes 34 and displace scented fluid which is forced out of the container through the holes 35 into the bore 25, through the outlet passageways 26 and into the water, thereby creating an effluvium of the scented fluid in the water in the vicinity of the device. When the valve member 24 is thus moved away from the rear end of the container the stem 27 moves with the member and further compresses the spring 29. When the force against the valve member to maintain the same in an unseated position is less than the pressure of the compressed spring 29, the spring will expand and move the member to its seated position. Factors controlling the amount of scented fluid dispensed from the device are the speed of movement of the device through the water, the weight of the sinker 39 and the adjustment of the initial compression of the spring 29. This latter may be varied, as desired, by adjusting the nuts 31 to either increase or decrease the initial compression of the spring.

I have found that the effluvium of scented fluid in the water attracts the fish toward the source of the scented fluid and the fish may be caught on hooks arranged in and around the effluvium. Instead of mounting the baited hooks 40 on the device, the device can be used without hooks and the hooks may be arranged on separate lines in the vicinity of the effluvium.

Moreover, the device may be pulled behind a boat while trolling with or without a sinker connected to the valve member and separate lines having fish hooks may be used or the hooks may be directly connected to the device. In this use of the device, the water impinging against the wall of the groove 32 of the valve member will unseat the same and the scented fluid will be discharged in the same manner as described hereinabove. The coloring of the device and the movement of the spinner 21 also assist in attracting the fish.

The scented fluid may be replaced in the container 10 as often as required and desired.

I claim:

1. A device for creating in water an effluvium of a scented fluid attractive to fish, comprising a container adapted to contain said fluid and having an inlet for water and an outlet for said fluid, and means for controlling water entering said container through said inlet and the discharge of said fluid through said outlet, including a single valve member adapted to open and close said inlet and outlet and spring means constantly urging said valve member to a closed position.

2. A device for discharging a fluid attractive to fish into the water in which the device is immersed, comprising a container having water inlet and fluid outlet openings therein, a protuberance on said container between said openings, a valve member adapted to open and close said openings and having a recess slidably receiving said protuberance and also having a passageway leading to the exterior of said valve member, and spring means constantly urging said valve member to close said openings, water being permitted to enter said container through said inlet opening when said valve member is in its open position, and causing said fluid to flow through said outlet opening into said passageway and into the surrounding water.

3. A device of the character described, comprising a container adapted to contain a fluid attractive to fish and having one end provided with a series of annularly arranged water inlet openings and a series of annnularly arranged fluid outlet openings within said first series, a valve member having an annular groove, said valve member being movably mounted on said container so as to open and close both said series of openings, an annular neck on said container arranged between said series of openings and slidably received by said annular groove in said valve member, said valve member having a passageway leading to the exterior thereof and communicating with said series of fluid outlet openings when said valve member is in an open position, and spring means constantly urging said valve member to a closed position.

4. A device of the character described, comprising a container adapted to contain a fluid attractive to fish and having one end provided with a water inlet opening and a fluid outlet opening, a valve member movably mounted on said container so as to open and close said openings, said valve member having a portion against which the water impinges when the device is moved through the water thereby to open said valve member and permit water to enter said container through said inlet opening which forces fluid to be discharged through said outlet opening, and spring means constantly urging said valve member to a closed position.

ALEX H. STARK.

REFERENCES CITED

The following references are of record in the file of this patent:

UNITED STATES PATENTS

| Number | Name | Date |
| --- | --- | --- |
| 135,113 | Goodman | Jan. 21, 1873 |
| 1,133,154 | Kahnweiler | Mar. 23, 1915 |
| 1,454,572 | Walters | May 8, 1923 |
| 1,861,466 | Bafetti | June 7, 1932 |
| 2,091,457 | Sauer | Aug. 31, 1937 |
| 2,171,372 | Peck | Aug. 29, 1939 |
| 2,296,492 | Begley | Sept. 22, 1942 |

FOREIGN PATENTS

| Number | Country | Date |
| --- | --- | --- |
| 788,322 | France | July 29, 1935 |